United States Patent
Stuntebeck et al.

(10) Patent No.: US 10,986,095 B2
(45) Date of Patent: Apr. 20, 2021

(54) SYSTEMS AND METHODS FOR CONTROLLING NETWORK ACCESS

(71) Applicant: AirWatch LLC, Atlanta, GA (US)

(72) Inventors: Erich Stuntebeck, Marietta, GA (US); Michelle Burnett, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 515 days.

(21) Appl. No.: 14/961,022

(22) Filed: Dec. 7, 2015

(65) Prior Publication Data

US 2016/0087987 A1 Mar. 24, 2016

Related U.S. Application Data

(63) Continuation of application No. 13/656,046, filed on Oct. 19, 2012, now Pat. No. 9,247,432.

(51) Int. Cl.
  *H04L 29/06* (2006.01)
  *H04W 12/00* (2021.01)
  *H04W 12/08* (2021.01)
  *H04W 12/02* (2009.01)

(52) U.S. Cl.
  CPC ............ *H04L 63/10* (2013.01); *H04L 63/20* (2013.01); *H04W 12/003* (2019.01); *H04W 12/08* (2013.01); *H04L 63/102* (2013.01); *H04W 12/00503* (2019.01); *H04W 12/02* (2013.01)

(58) Field of Classification Search
  CPC ................. H04L 63/10; H04L 63/20
  See application file for complete search history.

(56) References Cited

U.S. PATENT DOCUMENTS

| | | | |
|---|---|---|---|
| 5,574,786 A | 11/1996 | Dayan et al. | |
| 5,987,609 A | 11/1999 | Hasebe | |
| 6,021,492 A | 2/2000 | May | |
| 6,023,708 A | 2/2000 | Mendez et al. | |
| 6,070,243 A * | 5/2000 | See | G06F 21/31 709/229 |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |

(Continued)

FOREIGN PATENT DOCUMENTS

| | | |
|---|---|---|
| CA | 2149337 A1 | 6/1994 |
| GB | 2346716 A | 8/2000 |
| WO | 0241661 A2 | 5/2002 |

OTHER PUBLICATIONS

Search Query Report from IP.com (performed Dec. 10, 2020) (Year: 2020).*

(Continued)

*Primary Examiner* — Sharon S Lynch
(74) *Attorney, Agent, or Firm* — Thomas | Horstemeyer LLP

(57) ABSTRACT

A computing device obtains a request from a user device to access a network beacon. The computing device obtains a device profile for the user device. The computing device determines whether the user device satisfies an authorization rule based on the state of the user device as indicated by the device profile. The computing device authorizes the user device to access the network beacon responsive to determining that the user device satisfies the authorization rule.

20 Claims, 5 Drawing Sheets

(56) References Cited

U.S. PATENT DOCUMENTS

| | | | |
|---|---|---|---|
| 6,233,341 B1 | 5/2001 | Riggins | |
| 6,560,772 B1 | 5/2003 | Slinger | |
| 6,668,322 B1* | 12/2003 | Wood | G06F 21/41 713/182 |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,117,344 B1 | 10/2006 | Ohwada | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,376,431 B2* | 5/2008 | Niedermeyer | G06Q 20/04 379/114.14 |
| 7,378,939 B2* | 5/2008 | Sengupta | H04M 1/67 340/5.53 |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,496,957 B2 | 2/2009 | Howard et al. | |
| 7,539,665 B2 | 5/2009 | Mendez | |
| 7,565,314 B2* | 7/2009 | Borgeson | G06Q 10/087 705/26.3 |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,734,919 B2* | 6/2010 | Maeoka | H04M 1/57 713/169 |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,908,644 B2* | 3/2011 | Roskind | G06F 21/31 705/66 |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,225,381 B2 | 7/2012 | Lemke | |
| 8,504,831 B2* | 8/2013 | Pratt | G06F 21/40 713/150 |
| 8,516,552 B2* | 8/2013 | Raleigh | H04L 63/04 726/2 |
| 8,532,069 B2* | 9/2013 | Balwani | H04W 8/245 370/338 |
| 8,630,192 B2* | 1/2014 | Raleigh | G06Q 20/20 370/252 |
| 8,751,801 B2* | 6/2014 | Harris | G06F 21/31 713/168 |
| 8,774,781 B1* | 7/2014 | Speiser | H04L 29/06 455/411 |
| 8,869,243 B2* | 10/2014 | McGeehan | G06F 21/316 726/4 |
| 9,071,518 B2* | 6/2015 | Malik | H04L 41/0816 |
| 9,576,119 B2* | 2/2017 | McGeehan | G06F 21/316 |
| 2002/0003721 A1 | 1/2002 | Brug et al. | |
| 2002/0049644 A1* | 4/2002 | Kargman | G06Q 20/20 705/26.1 |
| 2002/0112052 A1* | 8/2002 | Brittingham | G06F 9/44505 709/224 |
| 2002/0123325 A1* | 9/2002 | Cooper | H04L 63/0492 455/411 |
| 2003/0110084 A1 | 6/2003 | Eberhard et al. | |
| 2003/0204716 A1 | 10/2003 | Rockwood et al. | |
| 2004/0054893 A1* | 3/2004 | Ellis | G06F 21/10 713/165 |
| 2004/0123153 A1 | 6/2004 | Wright et al. | |
| 2004/0181687 A1 | 9/2004 | Nachenberg et al. | |
| 2004/0187027 A1* | 9/2004 | Chan | G06F 21/10 705/51 |
| 2004/0203895 A1* | 10/2004 | Balasuriya | H04M 1/72577 455/456.1 |
| 2005/0097320 A1* | 5/2005 | Golan | G06F 21/40 713/166 |
| 2005/0221798 A1* | 10/2005 | Sengupta | H04M 1/67 455/411 |
| 2005/0246192 A1 | 11/2005 | Jauffred et al. | |
| 2005/0268107 A1* | 12/2005 | Harris | G06F 21/31 713/182 |
| 2005/0289095 A1* | 12/2005 | Rauhala | H04L 63/102 |
| 2006/0098678 A1* | 5/2006 | Tan | G06F 21/72 370/441 |
| 2006/0111125 A1* | 5/2006 | Karaoguz | H04L 63/083 455/456.2 |
| 2006/0190984 A1 | 8/2006 | Heard et al. | |
| 2006/0242692 A1* | 10/2006 | Thione | G06F 21/32 726/9 |
| 2006/0277187 A1* | 12/2006 | Roese | G01S 5/02 |
| 2006/0277408 A1* | 12/2006 | Bhat | H04W 24/10 713/173 |
| 2006/0282660 A1* | 12/2006 | Varghese | G06Q 20/341 713/155 |
| 2007/0033397 A1 | 2/2007 | Phillips, II et al. | |
| 2007/0060394 A1* | 3/2007 | Gowin | G06F 8/61 463/47 |
| 2007/0117558 A1* | 5/2007 | Balwani | H04W 8/245 455/421 |
| 2007/0136492 A1 | 6/2007 | Blum et al. | |
| 2007/0136573 A1* | 6/2007 | Steinberg | G06F 21/32 713/155 |
| 2007/0143824 A1* | 6/2007 | Shahbazi | H04W 12/06 726/1 |
| 2007/0156897 A1 | 7/2007 | Lim | |

(56) References Cited

U.S. PATENT DOCUMENTS

| | | |
|---|---|---|
| 2007/0174433 A1 | 7/2007 | Mendez et al. |
| 2007/0186106 A1* | 8/2007 | Ting ............... H04L 63/104 713/168 |
| 2007/0192588 A1* | 8/2007 | Roskind ............ G06F 21/31 713/155 |
| 2007/0260883 A1* | 11/2007 | Giobbi ............. G06Q 20/341 713/168 |
| 2007/0261099 A1 | 11/2007 | Broussard et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0134347 A1* | 6/2008 | Goyal ............. G06F 21/6209 726/29 |
| 2008/0189776 A1* | 8/2008 | Constable ............ G06F 21/32 726/7 |
| 2008/0201453 A1 | 8/2008 | Assenmacher |
| 2008/0271109 A1* | 10/2008 | Singh ................ H04L 63/08 726/1 |
| 2009/0036111 A1 | 2/2009 | Danford et al. |
| 2009/0089869 A1* | 4/2009 | Varghese ............ G06F 21/31 726/7 |
| 2009/0144632 A1 | 6/2009 | Mendez |
| 2009/0198997 A1 | 8/2009 | Yeap et al. |
| 2009/0253410 A1* | 10/2009 | Fitzgerald ........... G06F 21/88 455/411 |
| 2009/0260064 A1 | 10/2009 | McDowell et al. |
| 2009/0287921 A1* | 11/2009 | Zhu ................ G06Q 10/02 713/155 |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0138908 A1* | 6/2010 | Vennelakanti ......... G06F 21/33 726/11 |
| 2010/0144323 A1 | 6/2010 | Collins et al. |
| 2010/0146269 A1 | 6/2010 | Baskaran |
| 2010/0175116 A1* | 7/2010 | Gum ............... G06F 21/31 726/6 |
| 2010/0191604 A1* | 7/2010 | Raleigh ............ H04L 41/0806 705/16 |
| 2010/0211996 A1* | 8/2010 | McGeehan .......... G06F 21/316 726/4 |
| 2010/0211997 A1* | 8/2010 | McGeehan .......... G06F 21/316 726/4 |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0306533 A1* | 12/2010 | Phatak .............. G06F 21/34 713/156 |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167440 A1* | 7/2011 | Greenfield ......... H04L 63/102 725/25 |
| 2011/0167474 A1 | 7/2011 | Sinha et al. |
| 2011/0173545 A1* | 7/2011 | Meola ............. G06F 21/6218 715/743 |
| 2011/0202589 A1 | 8/2011 | Piernot et al. |
| 2011/0215921 A1* | 9/2011 | Ben Ayed ............ G08B 1/08 340/539.11 |
| 2011/0225252 A1 | 9/2011 | Bhat et al. |
| 2011/0247063 A1* | 10/2011 | Aabye .............. G06F 21/445 726/6 |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0314549 A1* | 12/2011 | Song ................ G06F 21/31 726/25 |
| 2011/0320552 A1 | 12/2011 | Friedman et al. |
| 2011/0321152 A1* | 12/2011 | Tor ................ H04L 63/164 726/12 |
| 2012/0005578 A1 | 1/2012 | Hawkins |
| 2012/0015644 A1 | 1/2012 | Danford et al. |
| 2012/0089845 A1* | 4/2012 | Raleigh ............ H04L 41/5045 713/176 |
| 2012/0102392 A1 | 4/2012 | Reesman et al. |
| 2012/0129503 A1* | 5/2012 | Lindeman ........... H04W 4/001 455/414.1 |
| 2012/0144468 A1* | 6/2012 | Pratt ............... G06F 21/40 726/7 |
| 2012/0167162 A1* | 6/2012 | Raleigh ............. G06F 21/57 726/1 |
| 2012/0198547 A1 | 8/2012 | Fredette et al. |
| 2012/0204032 A1* | 8/2012 | Wilkins ............. H04L 9/006 713/170 |
| 2012/0223133 A1* | 9/2012 | Miller ............ G06Q 20/1085 235/379 |
| 2012/0240183 A1* | 9/2012 | Sinha .............. H04W 12/08 726/1 |
| 2012/0240203 A1* | 9/2012 | Kling .............. G06Q 20/425 726/5 |
| 2012/0297456 A1* | 11/2012 | Rose ................ G06F 21/74 726/4 |
| 2012/0303827 A1* | 11/2012 | Neystadt ........... H04L 63/107 709/229 |
| 2012/0324242 A1* | 12/2012 | Kirsch ............. G06Q 20/0855 713/189 |
| 2012/0328101 A1* | 12/2012 | Lakshminarayanan ................. H04L 63/0823 380/258 |
| 2013/0007245 A1* | 1/2013 | Malik ............. H04L 41/0816 709/223 |
| 2013/0007848 A1* | 1/2013 | Chaskar ............ H04W 12/12 726/4 |
| 2013/0013933 A1* | 1/2013 | Adams ............. H04L 9/0891 713/189 |
| 2013/0031631 A1* | 1/2013 | Waltermann ......... G06F 21/575 726/23 |
| 2013/0061307 A1* | 3/2013 | Livne .............. H04W 12/06 726/7 |
| 2013/0091543 A1* | 4/2013 | Wade ............... G06F 21/54 726/1 |
| 2013/0152169 A1* | 6/2013 | Stuntebeck .......... H04L 67/16 726/4 |
| 2013/0167201 A1* | 6/2013 | Patel .............. H04L 67/1097 726/4 |
| 2013/0254401 A1* | 9/2013 | Marshall ........... H04L 47/70 709/226 |
| 2014/0040630 A1* | 2/2014 | Swaminathan ........ G06F 21/10 713/187 |
| 2014/0094159 A1* | 4/2014 | Raleigh ............ H04W 24/02 455/418 |
| 2014/0214688 A1* | 7/2014 | Weiner ............ G06Q 20/3227 705/71 |
| 2014/0289822 A1* | 9/2014 | Wilson ............. G06Q 20/42 726/5 |
| 2016/0330567 A1* | 11/2016 | Raleigh ........... G06Q 10/06315 |
| 2017/0118225 A1* | 4/2017 | McGeehan .......... H04L 63/107 |

OTHER PUBLICATIONS

Asynchrony Software, Inc., "PDA Defense User Guide", 726, 2002.
Belani, Eshwar, et al., "The Crisis Wide Area Security Architecture", 726, 1998.
Benaloh, Josh, et al., "Patient Controlled Encryption: Ensuring Privacy of Electronic Medical Records", 726, Nov. 13, 2009.

(56) References Cited

OTHER PUBLICATIONS

Fox, Armando, et al., "Security of the Move: Indirect Authentication Using Kerberos", 726, 1996.
Menaria, Pankaj, et al., "Security in Mobile Database Systems", 707, 726, Mar. 17, 2011.
Pfitzmann, Andreas, et al., "Mobile User Devices and Security Modules: Design for Trustworthiness," 726, Feb. 5, 1996.
Steiner, Jennifer, "Kerberos: An Authentication Service for Open Network Systems", 726, Nov. 12, 1988.
Strunk, John, et al., "Self-Securing Storage: Protecting Data in Compromised Systems", Symposium on Operating Systems Design and Implementation, 726, 2000.
Non-Final Office Action cited in U.S. Appl. No. 13/316,073 dated Jan. 18, 2013.

\* cited by examiner

SYSTEMS AND METHODS FOR CONTROLLING NETWORK ACCESS

CROSS-REFERENCE TO RELATED APPLICATIONS

This application is a continuation of and claims priority to application Ser. No. 13/656,046, filed on Oct. 19, 2012 and titled "SYSTEMS AND METHODS FOR CONTROLLING NETWORK ACCESS", which is incorporated by reference herein in its entirety.

FIELD OF THE INVENTION

Embodiments of the disclosure relate generally to data security, and more particularly, to systems and methods for controlling network access

BACKGROUND

Controlling network access is critical to ensure that only authorized client devices may gain access to sensitive information. To date, enterprises have utilized access lists to control which, if any, client devices may access networks. This method may control network access when the group of client devices that are authorized to access the network seldom fluctuates. However, this method is inadequate to control network access when the group of client devices that are authorized to access the network often fluctuates.

The group of client devices that are authorized to access a network seldom fluctuates when there is a non-transient relationship between a network and the client devices seeking access to the network. For example, a non-transient relationship may exist between a network and client devices where there is an employee-employer relationship between a network and the client devices seeking access to the network. On the contrary, the group of client devices that are authorized to access the network often fluctuates when there is a transient relationship between a network and client devices seeking access to the network. A transient relationship may exist between a network and client devices, for instance, where there is a service provider-customer relationship between a network and the client devices seeking access to the network. As many service providers wish to provide network access for their customers, systems and methods for controlling access to such networks are necessary to ensure that only authorized client devices may gain access to sensitive information.

BRIEF SUMMARY

Some or all of the above needs and/or problems may be addressed by certain embodiments of the disclosure. Certain embodiments may include systems and methods for controlling access to networks. According to one embodiment of the disclosure, there is disclosed a system. The system can include a memory that stores computer-executable instructions. The system can also include a processor configured to access the at least one memory. The processor is configured to execute the computer-executable instructions to perform a method including the steps of receiving one or more requests to access one or more network beacons from one or more client devices, determining whether the client devices satisfy one or more authorization rules associated with the network beacons, authorizing the client devices to access the network beacons in response to a determination that the client devices satisfy the authorization rules associated with the network beacons, and terminating the authorization of the client devices to access the network beacons if the client devices no longer satisfy the authorization rules associated with the network beacons.

According to another embodiment of the disclosure, there is disclosed a method. The method can include transmitting one or more requests to access one or more network beacons from one or more devices, receiving one or more resources associated with the network beacons on the client devices, and accessing the network beacons from the client devices.

Further, according to another embodiment of the disclosure, there is disclosed a non-transitory computer-readable medium embodying a program executable in a computing device, the program comprising code that, when executed by a computing device, causes the computing device to perform a method comprising the steps of identifying one or more client devices located within one or more transmission ranges of one or more network beacons, determining whether the client devices satisfy one or more authorization rules associated with the network beacons, and transmitting one or more resources associated with the network beacons to the client devices in response to a determination that the client devices satisfy the authorization rules associated with the network beacons.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, controlling access to networks. As an overview, access to networks may be controlled by limiting access to network beacons associated with a network to client devices that satisfy one or more authorization rules. In particular, the network beacons may include, for example, Wi-Fi beacons, cellular beacons, satellite beacons, Bluetooth beacons, radio beacons, and/or other beacons capable of transmitting data from a network to client devices. In certain embodiments, an access control service executed by an access control server may authorize one or more client devices that satisfy the authorization rules to access the network beacons.

The technical effects of certain embodiments of the disclosure may include establishing control of access to networks when access lists may not be predefined, and reducing and/or eliminating the burden of predefining access lists to control access to networks. Moreover, the technical effects of certain embodiments of the invention may include enhancing network access control by assigning specific access rights based on access lists to client devices 120 authorized to access the associated network beacons.

Figure 1:
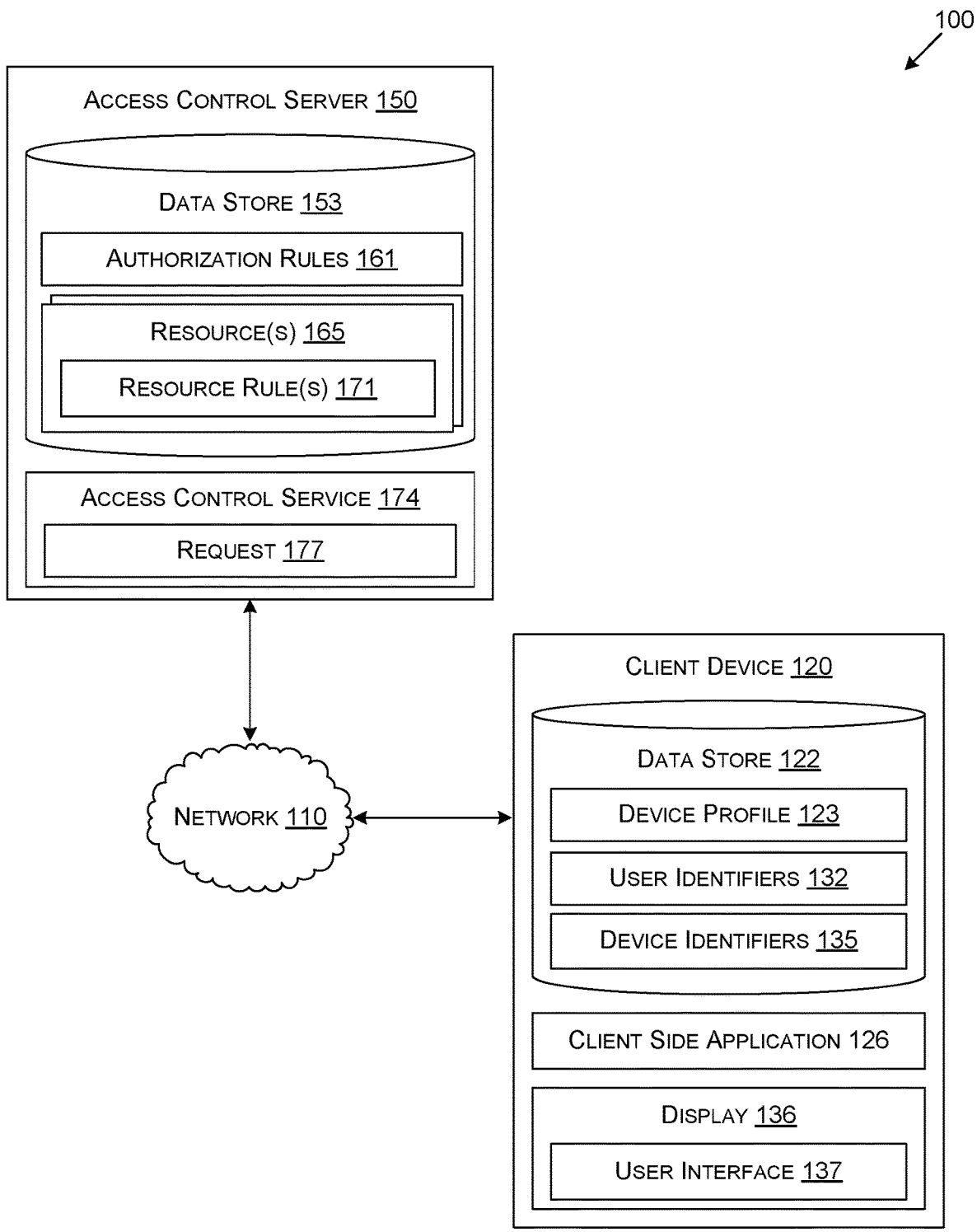
FIG. 1 illustrates a block diagram of a networked environment according to certain embodiments of the disclosure.

FIG. 1 depicts certain illustrative components for a networked environment 100 according to various embodiments. The networked environment 100 may include a network 110, a client device 120, and an access control server 150. The network 110 may be or include, for example, any type of wireless network such as a wireless local area network (WLAN), a wireless wide area network (WWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In one embodiment, the network 110 facilitates transmission of resources 165 between one or more client devices 120 and an access control server 150.

The client device 120 may comprise, for example, a cellular telephone, a smartphone and/or personal digital assistant, a tablet computer and/or web pad, a laptop computer, a desktop computer, a set-top box, a music player, a game console, and/or another device with like capability. For purposes of convenience, the client device 120 is referred to herein in the singular. Even though the client device 120 is referred to in the singular, it is understood that one or more client devices 120 may be employed in the arrangements as descried herein.

The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 is operable to communicate via wired connection with the access control server 150 with the aid of the wired network connectivity component. The client device 120 is further operable to communicate wirelessly with the access control server 150 with the aid of the wireless network connectivity component.

The client device 120 may comprise a memory for storing data and applications, a processor for executing applications stored in memory, a display 136 upon which the processor may execute one or more user interfaces 137, and a local interface such as a bus, as will be described with respect to FIG. 5. The memory of the client device 120 may comprise a data store 122. The data store 122 of the client device 120 may include a device profile 123. In one embodiment, the device profile 123 may represent hardware, software, and security attributes that describe the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. In another embodiment, the device profile 123 may further include characteristics describing the current state of the client device 120, including indications of the location of the client device 120, the current time associated with the client device 120, the client device's 120 detection of one or more network beacons associated with one or more networks 110, and the signal strength of the network beacons received by the client device 120. In yet another embodiment, the device profile 123 may include data indicating a date of a last virus scan of the client device 120, a date of a last access and/or service by an IT representative, a date of a last access by the access control service 174, and/or any other data indicating a date of last maintenance of the client device 120.

Additionally, the data store 122 of the client device 120 may include one or more user identifiers 132. The user identifiers 132 may uniquely identify the user of the client device 120. In one embodiment, the user identifiers 132 may include a username, a password, and/or biometric data related to facial recognition, retina recognition, fingerprint recognition, and the like. Similarly, the data store 122 of the client device 120 may include one or more device identifiers 135. The device identifiers 132 may uniquely identify the client device 120. In one embodiment, the device identifiers 135 may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. In another embodiment, the device identifier 135 may be a unique software identifier such a token or certificate, based at least in part on the aforementioned unique hardware identifiers.

The client device 120 may be configured to execute various applications. For example, the client device 120 may be configured to execute applications such as containerized content applications, web browsing applications, email applications, instant messaging applications, word processing applications and/or other applications capable of receiving and/or rendering resources 165 on a display 136 associated with the client device 120. Any application capable of receiving and/or rendering resources 165 on a display 136 of the client device 120 is generally referred to herein as a "client side application" 126. The client side application 126 may be stored in the memory of the client device 120. In one embodiment, the client side application 126 may be a containerized application that may be authorized to receive and render resources 165 in accordance with one or more resource rules 171, as described herein. The client side application 126 may include a decryption key to decrypt resources 165 encrypted with an encryption key in order to prevent unauthorized access to the resources 165. For instance, the client side application 126 may have a decryption key associated with an access control service 174 that may be used to decrypt resources 165 transmitted in an encrypted format to the client device 120 by the access control service 174.

The client side application 126 may be executed to transmit one or more requests 177 to access one or more network beacons associated with the network 110. In certain embodiments, the client side application 126 may transmit access requests 177 to an access control service 174 executed by an access control server 150 associated with the network beacons. In some embodiments, the client device 120 may be permitted to temporarily access the network beacons in order to transmit a request 177 to persistently access the network beacons. In particular, the client side application 126 may be permitted to render a web-based form via a user interface 137 that allows a user of the client device 120 to input one or more user identifiers 132 in order to compile a request 177 to persistently access the network beacons. In one embodiment, the request 177 may include the device profile 123 from the data store 122 of the client device 120. In another embodiment, the request 177 may include user identifiers 132 from the data store 122 of the client device 120. In yet another embodiment, the request 177 may include device identifiers 135 from the data store 122 of the client device 120.

The client side application 126 may be further executed to receive an indication that the client device 120 is authorized to access the network beacons associated with the network 110. In certain embodiments, the client side application 126 may receive an authorization indication from an access control service 174 executed by an access control server 150 associated with the network beacons. In one embodiment, the authorization indication may specify that the client device 120 is authorized to access the network beacons while the client device 120 is located within an authorized range of the network beacons. In particular, the authorized ranges associated with the network beacons may include one or more bounded physical areas where a client device 120 may be located within to access the network beacons, one or more ranges of IP addresses that may access the network beacons, one or more ranges of Wi-Fi SSID's that may access the network beacons, one or more ranges of client device 120 MAC addresses that may access the network beacons, one or more ranges of default gateway addresses and/or public internet addresses that may access the network beacons, one or more ranges of potential network beacon transmission associated with the network beacons, and one or more ranges of acceptable network beacon signal strength levels that may access the network beacons.

In another embodiment, the authorization indication may specify that the client device 120 is authorized to access the network beacons while one or more resources 165 associated with the network beacons are present on the client device 120. For instance, the resources 165 associated with the network beacons may individually and/or collectively form a key that may unlock access to the network 110 while the resources 165 are present on the client device 120. In yet another embodiment, the authorization indication may specify that the client device 120 is authorized to access specific domains and/or services provided via the network beacons based at least in part on one or more of the device profile 123, user identifiers 132, and device identifiers 135 associated with the client device 120.

The client side application 126 may be further executed to receive one or more resources 165. In certain embodiments, the client side application 126 may be configured to receive resources 165 associated with the network beacons if the client device 120 is located within an authorized range of the network beacons associated with the network 110. In some embodiments, the client side application 126 may receive resources 165 that individually and/or collectively form a key that may unlock access to network beacons while the resources 165 are present on the client device 120. In one embodiment, the client side application 126 may receive the resources 165 from an access control service 174 and/or another service executed by an access control server 150. In another embodiment, the client side application 126 may receive the resources 165 from a distribution service associated with the network 110 according to a distribution approach as described in application Ser. Nos. 13/396,356 and 13/623,627 both entitled "CONTROLLING DISTRIBUTION OF RESOURCES ON A NETWORK," which are incorporated herein by reference in their entirety.

In any instance, the resources 165 may include various types of electronic data that may be associated with the network 110, such as settings, applications, and content. In one embodiment, settings-type resources 165 may include hardware settings, software settings, and/or the like that configure the functionality provided by the client device 120. In another embodiment, application-type resources 165 may include book applications, business applications, catalogue applications, education applications, entertainment applications, finance applications, food and drink applications, games applications, health and fitness applications, lifestyle applications, medical applications, music applications, navigation applications, news applications, newsstand applications, photo and video applications, productivity applications, reference applications, social networking applications, sports applications, travel applications, utility applications, weather applications, and/or the like. In yet another embodiment, content-type resources 165 may include application content, video content, image content, audio content, text content, word processor content, presentation content, spreadsheet content, database content, compressed folder content, disk image content, encoded content, backup content, web content, page layout content, plug-in content, font content, system content, developer content, data content and/or the like.

Additionally, the resources 165 may include one or more resource rules 171. In certain embodiments, the resource rules 171 may describe and/or regulate the use of the resources 165. In one embodiment, the resources rules 171 may specify that the resources 165 may only be accessed by authorized and/or secure applications on the client device, such as the client side application 126. In another embodiment, the resource rules 171 may specify that the resources 165 may not be cut, copied, pasted, transmitted, text messaged, emailed, printed, screen captured, and/or manipulated. In yet another embodiment, the resource rules 171 may specify that the resources 165 are encrypted and may specify that one or more authorized and/or secure applications on the client device 120 have an appropriate decryption key to unlock the resources 165, such as the client side application 126. Additionally, the resource rules 171 may specify whether the resources 165 may be rendered while the client device 120 is offline and/or not in communication with the access control service 174, whether to permit synchronization of the resources 165 with a remote data store, whether to permit storing resources 165 locally on the client device 120, and whether the resources 165 may only be accessed at certain locations and/or times.

In other embodiments, the resource rules 171 may be metadata and/or other indications that describe the resources

165. In particular, the resources rules 171 may specify categories/sub-categories to which the resources 165 belong, that the resources 165 are considered favorites, the ownership of the resources 165, the managing party of the resources 165, that the resources 165 are confidential, that the resources 165 are password protected, that historical version of the resources 165, one or more descriptions of the resources 165, one or more comments regarding the resources 165, the size and format of the resources 165, the download priority associated with the resources 165, an expiration date associated with the resources 165, one or more effective dates associated with the resources 165, and/or the like.

In some embodiments, the resource rules 171 associated with the resources 165 may change based on the state of the client device 120. In certain embodiments, the stringency of the resource rules 171 may be increased, reduced, and/or eliminated based on the state of the client device 120. In one embodiment, the stringency of the resource rules 171 may be increased, reduced, and/or eliminated if the client device 120 is located within the transmission range of certain network beacons. For example, the resource rules 171 may specify that the resources 165 require an 8-digit password to access the resources 165 if the client device 120 is not located within the transmission range of a specific network beacon, and the resource rules 171 may specify that the resources 165 only require a 4-digit password to access the resources 165 if the client device 120 is located within the transmission range of the specific network beacon. In another embodiment, the stringency of the resource rules 171 may be increased, reduced, and/or eliminated if the client device 120 is located within the transmission range of network beacons associated with a certain network. For example, the resource rules 171 may specify that the resources 165 require a 256-bit encryption if the client device 120 is not located within the transmission range of network beacons associated with a specific network, and the resource rules 171 may specify that the resources 165 only require 128-bit encryption if the client device 120 is located within the transmission range of network beacons associated with the specific network. In another embodiment, the stringency of the resource rules 171 may be increased, reduced, and/or eliminated if the client device 120 is located within the transmission range of certain network beacons associated with certain networks. For example, the resource rules 171 may not apply to a client device 120 that is not located within the transmission range of any unknown network beacons and/or is not located within the transmission range of any network beacons associated with unknown networks.

The client side application 126 may be yet further executed to access one or more resources 165. In certain embodiments, the client side application 126 may access the resources 165 received from an access control service 174 and/or another distribution service. In some embodiments, the client side application 126 may access the resources 165 on the client device 120 in accordance with the resource rules 171, as described herein. For example, the client side application 126 may determine that a given resource 165 may not be accessed on a client device 120 because the client device 120 is not located within an authorized location. In any instance, the client side application 126 may access the resources 165 on the client device 120 by installing, activating, and/or executing the resources 165 on the client device 120. In one embodiment, the client side application 126 may access settings-type resources 165 by transmitting one or more associated settings files to the appropriate locations in the memory of the client device 120, disabling and/or removing any conflicting settings files, and instructing the client device 120 to conform its operations to the settings-type resources 165. In another embodiment, the client side application 126 may access application-type resources 165 by transmitting one or more associated application files to the appropriate locations in the memory of the client device 120, disabling and/or removing any conflicting application files, and instructing the client device 120 to execute the application-type resources 165.

In yet another embodiment, the client side application 126 may access content-type resources 165 by transmitting one or more associated content files to the appropriate locations in the memory of the client device 120, disabling and/or removing any conflicting content files, and instructing the client device 120 to execute one or more applications on the client device 120 capable of rendering and/or presenting the content-type resources 165 to a user of the client device 120. In particular, the client side application 126 may render and/or present the resources 165 in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120. Additionally, the client side application 126 may render and/or present a single resource 165 or a series of resources 165 in a comprehensive manner, such as presenting image files in a slideshow-style presentation. Furthermore, the client side application 126 may render and/or present an environment that displays an array of resources 165 in a single view, such as a category-based tree or outline format.

Additionally, the client side application 126 may be a containerized application that is configured to protect one or more resources 165 associated with one or more network beacons from unauthorized access. In certain embodiments, the client side application 126 may protect resources that have been received from an access control service 174 and/or are accessible on the client device 120. In one embodiment, the client side application 126 may be executed to identify metadata associated with the resources 165 and ensure that the resources 165 are accessed in accordance with the metadata. For instance, the client side application 126 may prohibit the cutting, copying, pasting, transmitting, emailing, text messaging, screen capturing, and/or otherwise manipulating the resources 165 while the resources 165 are being accessed. In another embodiment, the client side application 126 may prohibit other applications on the client device 120 and/or other services accessible to the client device 120 from accessing the resources 165. In particular, the client side application 126 may monitor the data stream between the network 110 and the client device 120, may block any access attempts by another application and/or service, may intercept the resources 165, and may present the intercepted resource 165 in a user interface 137 rendered by the client side application 126. In yet another embodiment, the client side application 126 may be executed to call on other services associated with the resources 165 that are executed on the access control server 150 or another server or device accessible to the client side application 126, for instance, a technical support service that may be executed by the access control server 150.

The access control server 150 may comprise, for example, a server computer or any other system providing access control capability. Alternatively, a plurality of access control servers 150 may be employed that are arranged, for example, in one or more server banks or computer banks or other arrangements. For example, a plurality of access control servers 150 together may comprise a cloud computing resource, a grid computing resource, and/or any other distributed computing arrangement. Such access control servers 150 may be located in a single installation or may be distributed among many different geographic locations. For purposes of convenience, the access control server 150 is referred to herein in the singular. Even though the access control server 150 is referred to in the singular, it is understood that a plurality of access control servers 150 may be employed in the arrangements as descried herein.

The access control server 150 may comprise a memory for storing data and applications and a processor for executing applications stored in memory, as will be described with respect to FIG. 5. The memory of the access control server 150 may comprise a data store 153. The data store 153 may be representative of one or more data stores, as can be appreciated. The data store 153 may contain certain data that is accessible to the access control server 150. In particular, the data store 153 may contain one or more authorization rules 161, one or more resources 165, and one or more resource rules 171 associated with the resources 165, as described herein. The data in the data store 153 may be associated with the operation of certain applications and/or functionalities executed by the access control server 150. The data store 153 may utilize strong encryption standards to protect the resources 165 from unauthorized access. For example, the data store 153 may utilize SHA-1 (Standard Hash Algorithm) or a similar strong encryption standard commonly utilized for server-side data storage.

The access control server 150 may execute certain applications and/or functionalities such the access control service 174, as well as other applications, services, processes, systems, engines, or functionality not disclosed in detail herein. The access control service 174 may be executed to limit access to one or more network beacons associated with a network 110. In particular, the access control service 174 may limit network beacon access to one or more client devices 120 that are authorized to access the network beacons associated with the network 110. The access control service 174 may be further executed to distribute one or more resources 165 associated with the network beacons to one or more client devices 120 that are authorized to access the network beacons.

The access control service 174 may be executed to control access to one or more network beacons associated with a network 110. In certain embodiments, the access control service 174 may limit authorization to access the network beacons to one or more client devices 120 that satisfy one or more authorization rules 161 associated with the network beacons. The authorization rules 161 may specify one or more required and/or permitted states that a client device 120 must satisfy in order for the client devices 120 to be authorized to access the network beacons. For example, the authorization rules 161 may include environment-related requirements, resource-related requirements, device-related requirements, and/or the like.

In one embodiment, the authorization rules 161 may include environment-related requirements that specify one or more locations where the client devices 120 may be authorized to access the network beacons and/or one or more times when the client devices 120 may be authorized to access the network beacons. For instance, the authorization rules 161 may specify that client devices 120 may be authorized to access the network beacons if the client devices 120 are located within one or more authorized locations associated with the network beacons. The authorized location may include a single location, a range of locations, and/or combinations thereof where the client devices 120 may be authorized to access the network beacons. Additionally, the authorization rules 161 may specify that the client devices 120 may be authorized to access the network beacons if the current times associated with the client devices 120 are within one or more authorized windows associated with the network beacons. The authorized windows may include a single time, a span of times, and/or combinations thereof when the client devices 120 may be authorized to access the network beacons.

In another embodiment, the authorization rules 161 may include resource-related requirements that specify that one or more resources 165 associated with the network beacons are required for the client devices 120 to be authorized to access the network beacons. In certain embodiments, the resources 165 associated with the network beacons may individually and/or collectively represent a key indicating that the client device 120 may be authorized to access the network beacons. In one embodiment, the resources 165 may represent a key while the resources 165 are accessed by the client devices 120. In particular, the resources 165 may be accessed by the client devices 120 when the resources 165 are stored on, installed on, activated on, and/or executed by the client device 120. In some embodiments, the authorization rules 161 may specify that the client devices 120 must further comply with one or more resource rules 171 associated with the resources 165 for the client devices 120 to access the resources 165. For instance, the resource rules 171 associated with the resources 165 may specify that the resources 165 may be accessed by the client devices 120 while the client devices 120 are located within an authorized location.

In yet another embodiment, the authorization rules 161 may include device-related requirements that specify one or more hardware requirements, software requirements, configuration requirements, maintenance requirements, and/or the like must be satisfied by the client device 120 for the client device 120 to be authorized to access the network beacons. For example, device hardware requirements may include requirements associated with the CPU, memory, power supply, external storage, peripherals, and/or the like. Device software requirements may include requirements associated with the operating system type and version, operating system authenticity and jailbreak/rooted status, installed application types and versions, and/or the like. Device configuration requirements may include requirements associated with the configuration of the hardware, software, data encryption methods, transport protocols, and/or the like. Additionally, device maintenance requirements may include requirements associated with the date of last virus scan for the client device 120, the date of the last access of the client device 120 by IT, the date of last communication between the client device 120 and the access control server 150, the date of last tune-up of the client device 120, and/or the like.

In some embodiments, the authorization rules 161 associated with the network beacons may change based on the state of the client device 120. In certain embodiments, the stringency of the authorization rules 161 may be increased, reduced, and/or eliminated based on the state of the client device 120. In one embodiment, the stringency of the authorization rules 161 may be increased, reduced, and/or eliminated if the client device 120 is located within the transmission range of certain network beacons. For example, the authorization rules 161 may specify that the network beacons require an 8-digit password to access the network beacons if the client device 120 is not located within the transmission range of a specific network beacon, and the resource rules 171 may specify that the network beacons only require a 4-digit password to access the network beacons if the client device 120 is located within the transmission range of the specific network beacon. In another embodiment, the stringency of the authorization rules 161 may be increased, reduced, and/or eliminated if the client device 120 is located within the transmission range of network beacons associated with a certain network. For example, the authorization rules 161 may specify that the network beacons require 256-bit encryption enabled if the client device 120 is not located within the transmission range of network beacons associated with a specific network, and the authorization rules 161 may specify that the network beacons only require 128-bit encryption if the client device 120 is located within the transmission range of network beacons associated with the specific network. In another embodiment, the stringency of the authorization rules 161 may be increased, reduced, and/or eliminated if the client device 120 is located within the transmission range of certain network beacons associated with certain networks. For example, the authorization rules 161 may not apply to a client device 120 that is not located within the transmission range of any unknown network beacons and/or is not located within the transmission range of any network beacons associated with unknown networks.

The access control service 174 may be executed to identify one or more client devices 120 that may potentially be authorized to access the network beacons. In certain embodiments, the access control service 174 identifies one or more client devices 120 that are located within the transmission range of the network beacons. In one embodiment, the access control service 174 may identify client devices 120 by receiving one or more requests 177 to access to the network beacons from the client devices 120. The requests 177 may include a device profile 123 describing the state of the associated client device 120, one or more user identifiers associated with the user of the client device 120, and/or one or more device identifiers associated with the client device 120. In another embodiment, the access control service 174 may identify client devices 120 that are located within one or more authorized locations associated with the network beacons. In yet another embodiment, the access control service 174 may identify client devices 120 whose current times are within one or more authorized windows associated with the network beacons.

The access control service 174 may be executed to determine whether one or more identified client devices 120 may be authorized access to the network beacons. In certain embodiments, the access control service 174 may determine whether one or more client devices 120 may be authorized access to the network beacons based on one or more authorization rules 161 associated with the network beacons. For example, the access control service 174 may determine whether the client devices 120 satisfy the authorization rules 161 based at least in part on a device profile 123 associated with the client devices 120.

The access control service 174 may be executed to authorize one or more client devices 120 to access to the network beacons. In one embodiment, the access control service 174 may authorize a client device 120 by transmitting an authorization key to the client device 120 that allows the client device 120 to access the network beacons. In another embodiment, the access control service 174 may authorize a client device 120 by transmitting one or more resources 165 associated with the network beacons to the client device 120 that individually and/or collectively represent a key that may unlock access to the network beacons. In yet another embodiment, the access control service 174 may authorize a client device 120 by transmitting an indication to the network beacons that specifies that the client device 120 is authorized to access the network beacons.

In certain embodiments, the access control service 174 may specify one or more access rights associated with the client devices 120 when the access control service 174 authorizes the client devices 120 to access the network beacons. In some embodiments, the access control service 174 may rely on one or more access lists to determine one or more specific access rights associated with the client devices 120 which the access control service 174 has determined are authorized to access the network beacons. The access rights may specify which data and/or services associated with the network beacons may be accessed by the client devices 120 associated with the access rights that have been determined to be authorized to access the network beacons. As an example, an administrator of the access control service 174 may predefine an access list including the identities of a group of client devices associated with an enterprise. Once the access control service 174 has determined that a given client device 120 is authorized to access the network beacons, the access control service 174 may, for example, determine whether the client device 120 is a member of the predefined access list of client devices 120 associated with the enterprise and, if so, assign the access rights associated with the enterprise to the client device 120.

The access control service 174 may be further executed to terminate the authorization of one or more client devices 120 to access to the network beacons. In certain embodiments, the access control service 174 may terminate the authorization of client devices 120 that do not satisfy the authorization rules 161 associated with the network beacons. For example, the access control service 174 may terminate the authorization of client devices 120 that are not located within an authorized range of the network beacons, that do not have resources 165 associated with the network beacons executed on the client device 120, and that do not satisfy resource rules 171 associated with the resources 165. In some embodiments, the access control service 174 may terminate the authorization of client devices 120 previously provided to the client devices 120 by the access control service 174 and/or another service controlling access to the network 110. In one embodiment, the access control service 174 may terminate the authorization of client devices 120 by removing an authorization key from the client devices 120 that allows the client devices 120 to access the network beacons. In another embodiment, the access control service 174 may terminate the authorization of client devices 120 by removing one or more resources 165 from the client devices 120 that individually and/or collectively represent a key that allows the client device 120 to access to the network beacons. In yet another embodiment, the access control service 174 may terminate the authorization of client devices 120 by transmitting an indication to the network beacons that specifies that the client device 120 is no longer authorized to access the network beacons.

The access control service 174 may be further executed to provide one or more authorized client devices 120 with access to a network 110 associated with the network beacons. In certain embodiments, the access control service 174 may represent a gateway to a network 110 associated with the network beacons. In one embodiment, the access control service 174 may be configured to provide client devices 120 with access to the network 110 if the client devices 120 are authorized to access the network beacons based on the authorization rules 161. In another embodiment, the access control service 174 may be configured to block client device 120 from accessing the network 110 if the client devices 120 are not authorized to access the network beacons based on the authorization rules 161.

Figure 2:
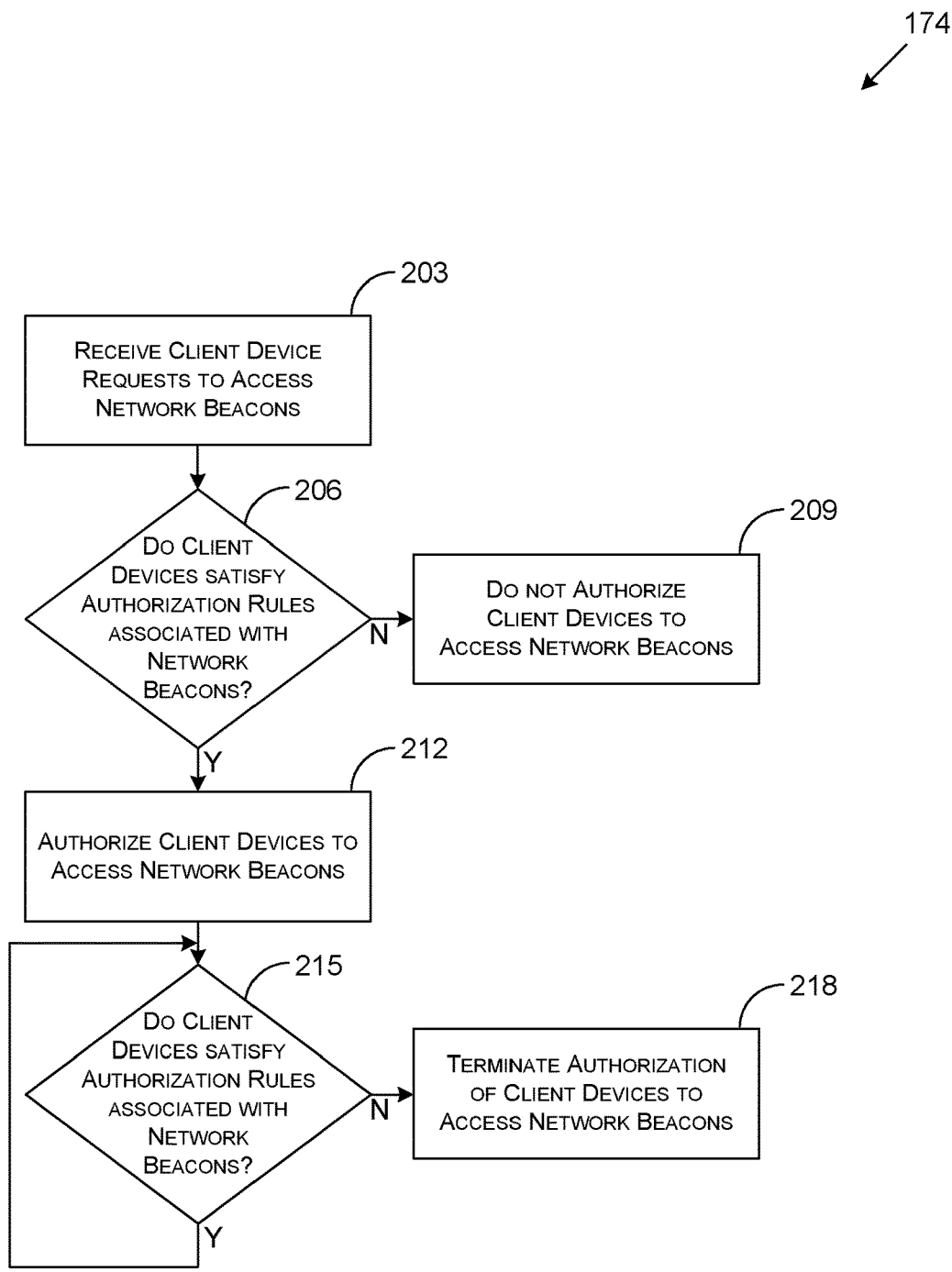
FIG. 2 illustrates flow diagrams of exemplary functionality performed by an access control service executed by an access control server in the networked environment of FIG. 1 according to certain embodiments of the present disclosure.

FIG. 2 is a flowchart illustrating exemplary functionality performed by a access control service 174 executed by a access control server (FIG. 1) according to certain embodiments. It is understood that the flowchart of FIG. 2 provides merely an example of the many different types of functional arrangements that may be employed to implement the operation of the access control service 174 as described herein. As an alternative, the flowchart of FIG. 2 may be viewed as depicting an example of steps of a method implemented in the access control server 150 according to one or more embodiments.

Beginning with step 203, the access control service 174 may receive one or more requests 177 from one or more client devices 120 that request access to one or more network beacons. In certain embodiments, the requests 177 may include data that may assist the access control service 174 in determining whether the client devices 120 from which the requests 177 were received are authorized to access the network beacons. In one embodiment, the requests 177 may include one or more device profiles 123 associated with client devices 120. In another embodiment, the requests 177 may include one or more user identifiers 132 associated with the client devices 120. In yet another embodiment, the requests 177 may include one or more device identifiers 135 associated with the client devices 120.

Next, in step 206, the access control service 174 may determine whether the client devices 120 from which the requests 177 were received are authorized to access the network beacons. In certain embodiments, the access control service 174 may determine whether the client devices 120 satisfy one or more authorization rules 161 (FIG. 1) associated with the network beacons that must be satisfied by the client devices 120 in order for the client devices 120 to be authorized to access the network beacons. In one embodiment, the authorization rules 161 may require that one or more resources 165 associated with the network beacons be accessed by the client devices 120, as described herein. In another embodiment, the authorization rules 161 may require that the client devices 120 are located within one or more authorized ranges associated with the network beacons. In yet another embodiment, the authorization rules 161 may require that the current times associated with the client devices 120 are within one or more authorized windows associated with the network beacons.

If the access control service 174 determines that the client devices 120 do not satisfy the authorization rules 161 associated with the network beacons, then the access control service 174 may proceed to step 209 and may not authorize the client devices 120 to access the network beacons. In certain embodiments, the access control service 174 may transmit an indication to the client devices 120 and/or the network beacons specifying that the client devices 120 are not authorized to access the network beacons. In some embodiments, the access control service 174 may take no further action once it has been determined that the client devices 120 from which it received the requests 177 are not authorized to access the network beacons.

On the contrary, if the access control service 174 determines that the client devices 120 do satisfy the authorization rules 161 associated with the network beacons, then the access control service 174 may proceed to step 212 and may authorize the client devices 120 to access the network beacons. In one embodiment, the access control service 174 may transmit an indication to the client devices 120 and/or the network beacons specifying that the client devices 120 are authorized to access the network beacons. In another embodiment, the access control service 174 may transmit one or more resources 165 associated with the network beacons to the client devices 120 that unlock access to the network beacons.

Then, in step 215, the access control service 174 may determine whether previously authorized client devices 120 continue to satisfy the authorization rules 161 associated with the network beacons. In certain embodiments, the access control service 174 may determine whether the client devices 120 satisfy the authorization rules 161 on a periodic basis. For example, an administrator of the access control service 174 may configure an interval upon which the access control service 174 determines whether the authorization rules 161 remain satisfied by the client devices 120.

If the access control service 174 determines that the authorization rules 161 remain satisfied by the client devices 120, then the access control service 174 may return to the beginning of step 215 and may again perform step 215 on a configured interval. However, if the access control service 174 determines that the client devices 120 no longer satisfy the authorization rules 161 associated with the network beacons, the access control service 174 may proceed to step 218 and may terminate the authorization of the client devices 120 to access the network beacons. In one embodiment, the access control service 174 may transmit an indication to the client devices 120 and/or the network beacons specifying that the client devices 120 are not authorized to access the network beacons. In another embodiment, the access control service 174 may remove one or more resources 165 from the client devices 120 that are required in order for the client devices 120 to access the network beacons.

Figure 3:
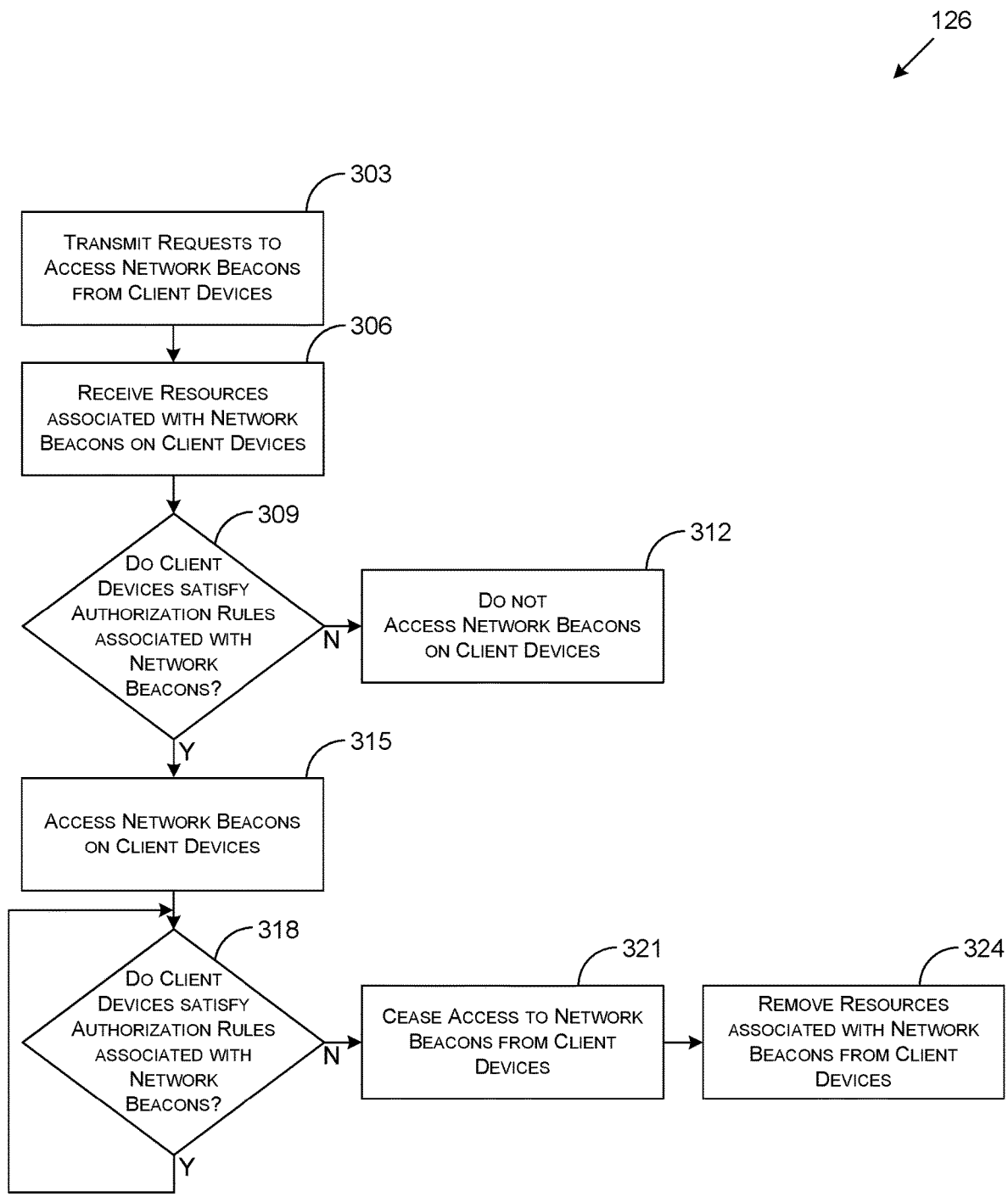
FIG. 3 illustrates flow diagrams of exemplary functionality performed by a client side application executed by a client device in the networked environment of FIG. 1 according to certain embodiments of the present disclosure.

FIG. 3 is a flowchart illustrating exemplary functionality performed by one or more client side applications 126 executed by one or more client devices 120 (FIG. 1) according to certain embodiments. It is understood that the flowchart of FIG. 3 provides merely an example of the many different types of functional arrangements that may be employed to implement the operation of the client side applications 126 as described herein. As an alternative, the flowchart of FIG. 3 may be viewed as depicting an example of steps of a method implemented in the client devices 120 according to one or more embodiments.

Beginning with step 303, one or more client side applications 126 executed by one or more client devices 120 may transmit one or more requests 177 (FIG. 1) to access one or more network beacons. In certain embodiments, the client side applications 126 may transmit the requests 177 to an access control service 174 (FIG. 1), as described herein. In some embodiments, the requests 177 may include data that may indicate whether the client devices 120 are authorized to access the network beacons. In one embodiment, the requests 177 may include one or more device profiles 123 associated with client devices 120. In another embodiment, the requests 177 may include one or more user identifiers 132 associated with the client devices 120. In yet another embodiment, the requests 177 may include one or more device identifiers 135 associated with the client devices 120.

Next, in step 306, the client devices 120 may receive one or more resources 165 associated with the network beacons. In certain embodiments, the client side applications 126 may receive the resources 165 from an access control service 174. In some embodiments, the resources 165 may unlock access to the network beacons while the resources 165 are accessed by the client devices 120. In any instance, the resources 165 may include, for example, settings-type resources 165 that may be activated on the client devices 120, application-type resources 165 that may be installed and/or executed by the client devices 120, and content-type resources 165 that may be stored and/or rendered on the client devices 120.

Then, in step 309, the client side applications 126 may determine whether the client devices 120 are authorized to access the network beacons. In certain embodiments, the client side applications 126 may determine whether the client devices 120 satisfy one or more authorization rules 161 (FIG. 1) associated with the network beacons. In one embodiment, the authorization rules 161 may require that one or more resources 165 associated with the network beacons be accessed by the client devices 120, as described herein. In another embodiment, the authorization rules 161 may require that the client devices 120 are located within one or more authorized locations associated with the network beacons. In yet another embodiment, the authorization rules 161 may require that the current times associated with the client devices 120 are within one or more authorized windows associated with the network beacons.

If the client side applications 126 determine that the client devices 120 are not authorized to access the network beacons, then the client side applications 126 may proceed to step 312 and may not access the network beacons. On the other hand, if the client side applications 126 determine that the client devices 120 are authorized to access the network beacons, then the client side applications 126 may proceed to step 315 and may access the network beacons on the client devices 120. In certain embodiments, the client side applications 126 may provide the client devices 120 with access to the network beacons by facilitating a communicative connection between the client devices 120 and the network 110 via the network beacons. The client side applications 126 may, for instance, receive data on the client devices 120 from a network 110 associated with the network beacons and may transmit data from the client device 120 to the network 110 associated with the network beacons.

Next, in step 318, the client side applications 126 may determine whether the client devices 120 continue to satisfy the authorization rules 161 associated with the network beacons. In certain embodiments, the client side applications 126 may determine whether the client devices 120 satisfy the authorization rules 161 on a periodic basis. For example, an administrator of the client side applications 126 may configure an interval upon which the client side applications 126 may determine whether the authorization rules 161 are satisfied by the client devices 120 with access to the network beacons.

If the client side applications 126 determine that the authorization rules 161 remain satisfied by the client devices 120, then the client side applications 126 may return to the beginning of step 215 and may again perform step 215 on a configured interval. However, if the client side applications 126 determine that the client devices 120 no longer satisfy the authorization rules 161 associated with the network beacons, the client side applications 126 may proceed to step 321 and may cease access to the network beacons. In one embodiment, the client side applications 126 may cease access to the network beacons by blocking access to the network beacons. In another embodiment, the client side applications 126 may cease access to the network beacons by removing resources 165 from the client devices that are required to access the network beacons. In yet another embodiment, the client side applications 126 may transmit an indication to the network beacons that specifies that the client devices 120 are no longer authorized to access the network beacons.

Then, in addition to ceasing access to the network beacons upon a determination that the client devices 120 do not satisfy the authorization rules 161 associated with the network beacons, the client side applications 126 may proceed to step 324 and remove one or more resources 165 associated with the network beacons from the client devices 120. In certain embodiments, the client side applications 126 may delete the resources 165 associated with the network beacons from the client devices 120. In some embodiments, the client side applications 126 may make the resources 165 inoperable while the client devices 120 do not satisfy the authorization rules 161 associated with the network beacons. In any instance, the client side applications 126 may stop the resources 165 from unlocking access to the network beacons.

Figure 4:
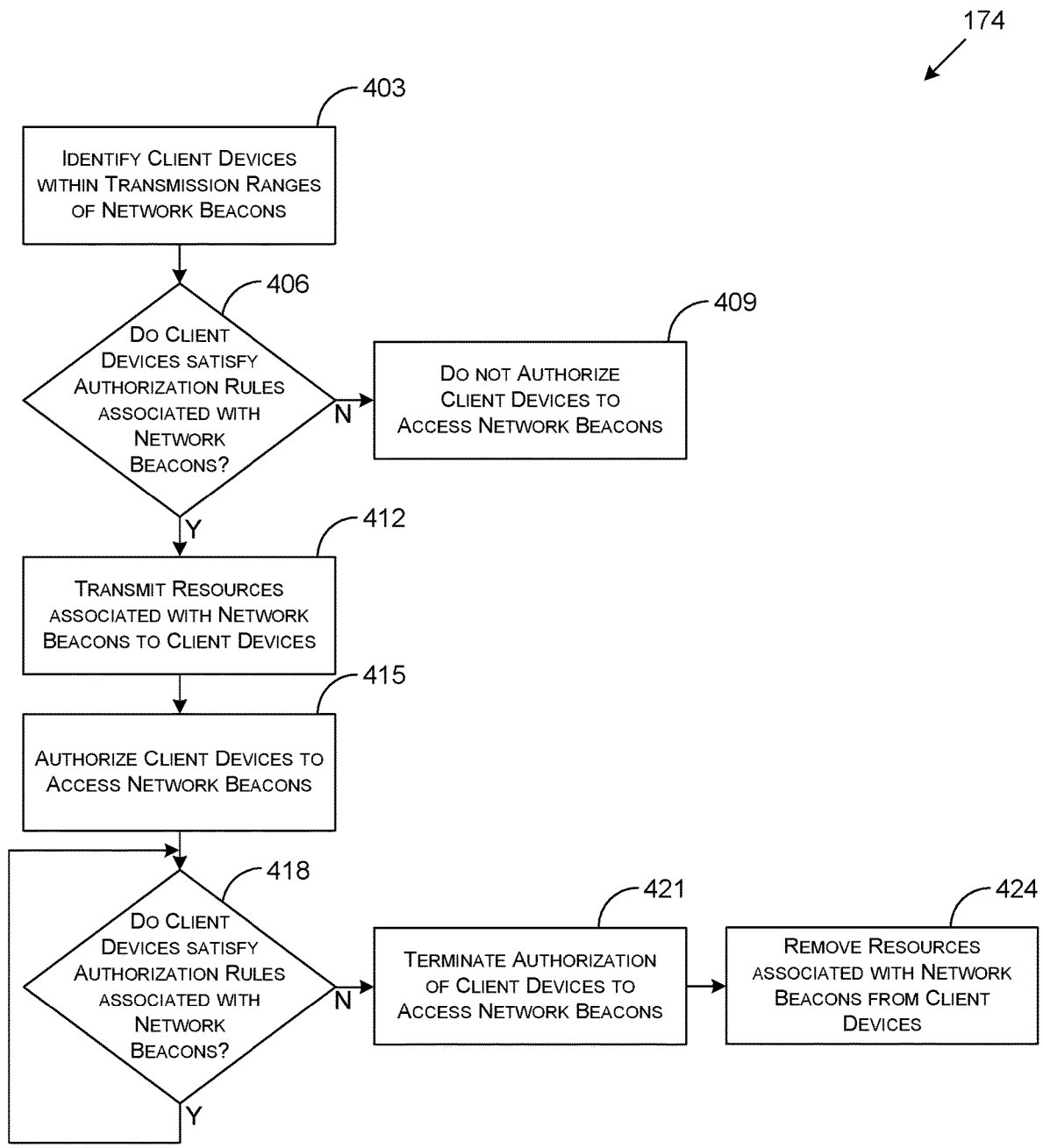
FIG. 4 illustrates flow diagrams of exemplary functionality performed by an access control service executed by an access control server in the networked environment of FIG. 1 according to certain embodiments of the present disclosure.

FIG. 4 is a flowchart illustrating exemplary functionality performed by one or more access control services 174 executed by one or more access control servers 150 (FIG. 1) according to certain embodiments. It is understood that the flowchart of FIG. 4 provides merely an example of the many different types of functional arrangements that may be employed to implement the operation of the access control service 174 as described herein. As an alternative, the flowchart of FIG. 4 may be viewed as depicting an example of steps of a method implemented in the access control server 150 according to one or more embodiments.

Beginning with step 403, an access control service 174 may identify one or more client devices 120 located within one or more transmission ranges of one or more network beacons. In certain embodiments, the transmission ranges of the network beacons may include the area within which a client device 120 may transmit data to and/or receive data from the network beacons. In one embodiment, the access control service 174 may identify the locations of client devices 120 by requesting that the client devices 120 provide an indication of their respective locations. In another embodiment, the access control service 174 may identify the locations of client devices 120 from the device profiles 123 (FIG. 1) associated with the client devices 120. In any instance, the access control service 174 may identify client devices 120 located within the transmission ranges of the network beacons by determining whether the locations of the client devices 120 are within the transmission ranges of the network beacons.

Next, in step 406, the access control service 174 may determine whether the identified client devices 120 are authorized to access the network beacons. In certain embodiments, the access control service 174 may determine whether the client devices 120 satisfy one or more authorization rules 161 (FIG. 1) associated with the network beacons. In one embodiment, the authorization rules 161 may require that one or more resources 165 associated with the network beacons be accessed by the client devices 120. In another embodiment, the authorization rules 161 may require that the client devices 120 are located within one or more authorized ranges associated with the network beacons. In yet another embodiment, the authorization rules 161 may require that the current times associated with the client devices 120 are within one or more authorized windows associated with the network beacons.

If the access control service 174 determines that the client devices 120 do not satisfy the authorization rules 161 associated with the network beacons, then the access control service 174 may proceed to step 409 and may not authorize the client devices 120 to access the network beacons. In certain embodiments, the access control service 174 may transmit an indication to the client devices 120 and/or the network beacons specifying that the client devices 120 are not authorized to access the network beacons. In some embodiments, the access control service 174 may take no further action once it has been determined that the identified client devices 120 are not authorized to access the network beacons.

On the contrary, if the access control service 174 determines that the client devices 120 satisfy the authorization rules 161 associated with the network beacons, then the access control service 174 may proceed to step 412 and may transmit one or more resources 165 associated with the network beacons to the client devices 120. In certain embodiments, the access control service 174 may transmit the resources 165 to one or more client side applications 126 (FIG. 1) executed by the client devices 120. The client side application 126 may be a containerized application, for example, that controls the manner in which the resources 165 may be accessed. For example, the client side application 126 may prohibit the resources 165 from being cut, copied, pasted, transmitted, screen captured, printed, and/or otherwise accessed outside of the containerized environment of the client side application 126. In any instance, the resources 165 may include settings-type resources 165, application-type resources 165, and content-type resources 165, as described herein.

Then, in addition to transmitting resources 165 associated with the network beacons to the client devices 120 upon a determination that the client devices 120 satisfy the authorization rules 161 associated with the network beacons, the access control service 174 may proceed to step 415 and may authorize the client devices 120 to access the network beacons. In certain embodiments, the access control service 174 may authorize the client devices 120 to access the network beacons by transmitting an authorization key to the client devices 120 that allows the client devices 120 to unlock access the network beacons. In some embodiments, the resources 165 associated with the network beacons that were transmitted to the client devices in step 412 may individually and/or collectively unlock access to the network beacons. In other embodiments, the access control service 174 may authorize the client devices 120 by transmitting an indication to the network beacons that specifies that the client devices 120 are authorized to access the network beacons.

Next, in step 418, the access control service 174 may determine whether the client devices 120 continue to satisfy the authorization rules 161 associated with the network beacons. In certain embodiments, the access control service 174 may determine whether the client devices 120 satisfy the authorization rules 161 on a periodic basis. For example, an administrator of the access control service 174 may configure an interval upon which the access control service 174 may determine whether the authorization rules 161 are satisfied by the client devices 120.

If the access control service 174 determines that the authorization rules 161 remain satisfied by the client devices 120, then the access control service 174 may return to the beginning of step 215 and may again perform step 215 on a configured interval. However, if the access control service 174 determines that the client devices 120 no longer satisfy the authorization rules 161 associated with the network beacons, the access control service 174 may proceed to step 421 and may terminate the authorization of the client devices 120 to access the network beacons. In one embodiment, the access control service 174 may transmit one or more instructions to the client devices 120 that block access to the network beacons. In another embodiment, the access control service 174 may disable one or more resources 165 on the client devices 120 that are required to access the network beacons. In yet another embodiment, the access control service 174 may terminate the authorization of the client devices 120 by transmitting an indication to the network beacons that specifies that the client devices 120 are no longer authorized to access the network beacons.

Then, in addition to terminating the authorization of the client devices 120 to access the network beacons upon a determination that the client devices 120 do not satisfy the authorization rules 161 associated with the network beacons, the access control service 174 may proceed to step 424 and may remove one or more resources 165 associated with the network beacons from the client devices 120. In certain embodiments, the access control service 174 may delete the resources 165 associated with the network beacons from the client devices 120. In some embodiments, the access control service 174 may disable the resources 165 while the client devices 120 do not satisfy the authorization rules 161 associated with the network beacons. In any instance, the access control service 174 may stop the resources 165 from unlocking access to the network beacons.

Figure 5:
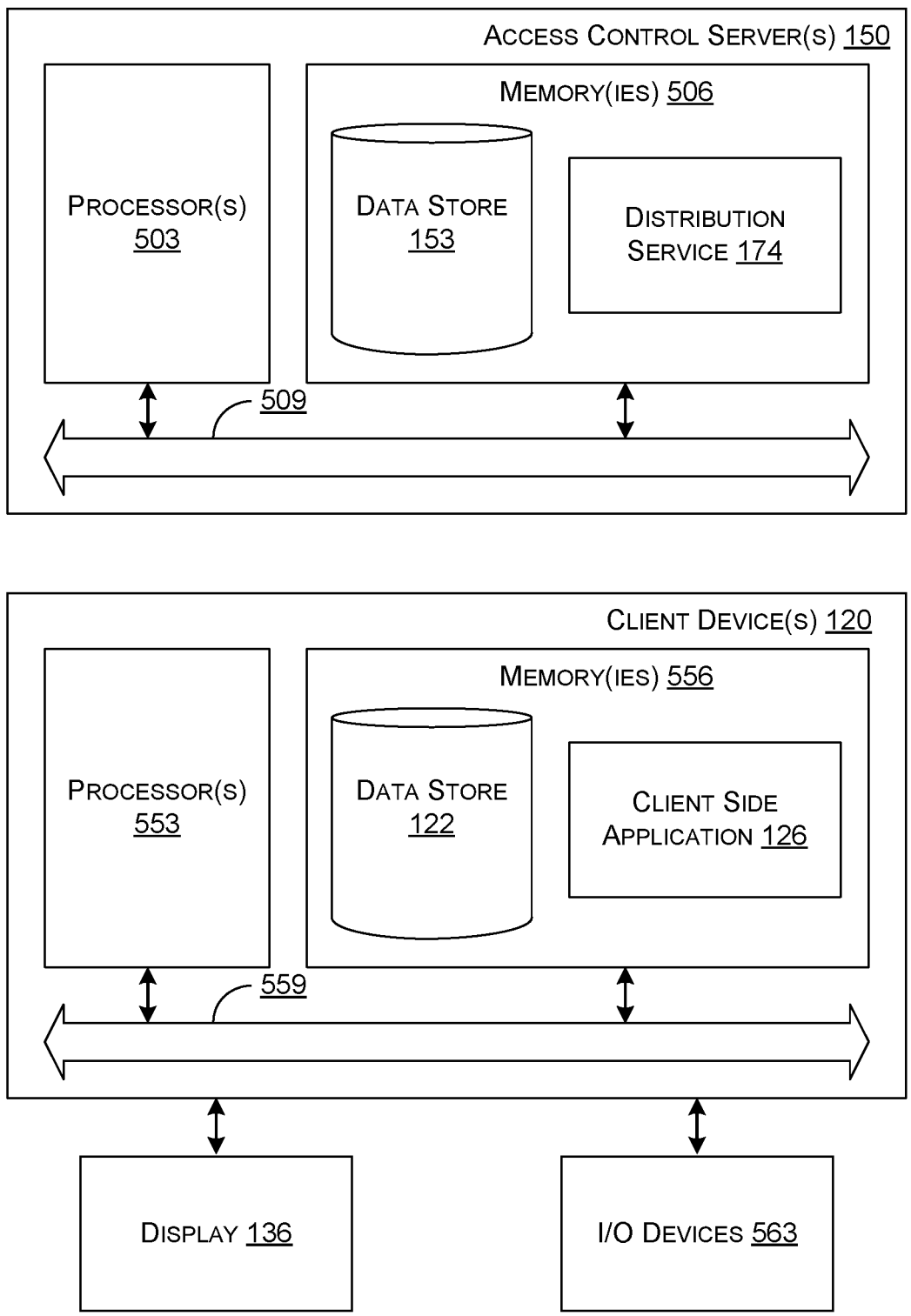
FIG. 5 illustrates schematic block diagrams of an access control server and a client device employed in the network environment of FIG. 1 according to certain embodiments of the disclosure.

FIG. 5 shows schematic block diagrams of an exemplary access control server 150 and an exemplary client device 120 according to an embodiment of the present disclosure. The access control server 150 includes at least one processor circuit, for example, having a processor 503 and a memory 506, both of which are coupled to a local interface 509. To this end, the access control server 150 may comprise, for example, at least one server computer or like device. Similarly, the client device 120 includes at least one processor circuit, for example, having a processor 553 and a memory 556, both of which are coupled to a local interface 559. Additionally, the client device 120 may be in data communication with a display 136 for rendering user interfaces 137 (FIG. 1) and one or more other I/O devices 563 for inputting and outputting data. To this end, the client device 120 may comprise, for example, at least one client computer or like device.

The following is a general discussion of the components of the access control server 150 and the client device 120. The local interface 509 and 559 may comprise, for example, a data bus with an accompanying address/control bus or other bus structure as can be appreciated. Stored in the memory 506 and 556 are both data and several components that are executable by the processors 503 and 553. In particular, with regard to the access control server 150, stored in the memory 506 and executable by the processor 503 are an access control service 174 and potentially other applications. Additionally, with regard to the client device 120, stored in the memory 556 and executable by the processor 553 are a client side application 126 and potentially other applications. Also stored in the memory 506 and 556 may be a data store 153 and 122 and other data. In addition, an operating system may be stored in the memory 506 and 556 and executable by the processor 503 and 553. It is to be understood that there may be other applications that are stored in the memory 506 and 556 and are executable by the processor 503 and 553 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and 556 and are executable by the processor 503 and 553. In this respect, the term "executable" means a program file that is in a form that can ultimately be run by the processor 503 and 553. Examples of executable programs may be, for example, a compiled program that can be translated into machine code in a format that can be loaded into a random access portion of the memory 506 and 556 and run by the processor 503 and 553, source code that may be expressed in proper format such as object code that is capable of being loaded into a random access portion of the memory 506 and 556 and executed by the processor 503 and 553, or source code that may be interpreted by another executable program to generate instructions in a random access portion of the memory 506 and 556 to be executed by the processor 503 and 553, etc. An executable program may be stored in any portion or component of the memory 506 and 556 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 and 556 are defined herein as including both volatile and nonvolatile memory and data storage components. Volatile components are those that do not retain data values upon loss of power. Nonvolatile components are those that retain data upon a loss of power. Thus, the memory 506 and 556 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 and 553 may represent multiple processors, and the memory 506 and 556 may represent multiple memories that operate in parallel processing circuits, respectively. In such a case, the local interface 509 and 559 may be an appropriate network 110 (FIG. 1) that facilitates communication between any two of the multiple processors 503 and 553, or between any two of the memory 506 and 556, etc. The local interface 509 and 559 may comprise additional systems designed to coordinate this communication, including, for example, performing load balancing. The processor 503 and 553 may be of electrical or of some other available construction.

Although the access control service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, and 4 show certain functionality and operations performed by the access control service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 and 553 in a computer system or other system. The machine code may be converted from the source code, etc. If embodied in hardware, each block may represent a circuit or a number of interconnected circuits to implement the specified logical function(s).

Although the flowcharts of FIGS. 2, 3, and 4 show a specific order of execution, it is understood that the order of execution may differ from that which is depicted. For example, the order of execution of two or more steps may be scrambled relative to the order shown. Also, two or more blocks shown in succession in FIGS. 2, 3, and 4 may be executed concurrently or with partial concurrence. Further, in some embodiments, one or more of the steps shown in FIGS. 2, 3, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the access control service 174 and the client side application 126, that comprises software or code can be embodied in any non-transitory computer-readable medium for use by or in connection with an instruction execution system such as, for example, a processor 503 and 553 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a computing device; and
    a storage device storing a plurality of computer instructions executable by the computing device, wherein the plurality of computer instructions cause the computing device to at least:
        obtain a request from a user device to access a wireless network beacon;
        obtain a device profile for the user device based at least in part on the request, wherein the device profile indicates a state of the user device;
        determine that the user device satisfies an authorization rule based on the state of the user device as indicated by the device profile;
        cause the user device to access at least one resource, the at least one resource corresponding to at least one resource rule specifying that the at least one resource is encrypted and that the user device contains at least one mechanism to decrypt the at least one resource;
        authorize the user device to access the wireless network beacon responsive to determining that the user device satisfies the authorization rule and the at least one resource rule;
        configure at least one setting on the user device based at least in part on a management policy and the wireless network beacon responsive to authorizing the user device to access the wireless network beacon, wherein the at least one setting alters at least one functionality provided by the user device;
        determine a stringency of the authorization rule based on the state of the user device as indicated by the device profile subsequent to authorizing the user device to access the wireless network beacon; and
        determine that the user device fails to satisfy the authorization rule based at least in part on the stringency subsequent to authorizing the user device to access the wireless network beacon.

2. The system of claim 1, wherein the plurality of computer instructions further cause the computing device to at least terminate access to the wireless network beacon for the user device responsive to determining that the user device fails to satisfy the authorization rule.

3. The system of claim 1, wherein the plurality of computer instructions further cause the computing device to at least transmit a key to the user device in response to determining that the user device satisfies the authorization rule, wherein the key facilitates access to a network associated with the wireless network beacon.

4. The system of claim 3, wherein the plurality of computer instructions further cause the computing device to at least cause the key to be removed from the user device responsive to determining that the user device fails to satisfy the authorization rule.

5. The system of claim 1, wherein when accessing at least one resource, the plurality of computer instructions further cause the computing device to at least:
    transmit an associated content file into a memory location of a memory on the user device;
    remove a conflicting content file from the memory; and
    execute at least one application on the user device, the at least one application configured to render a content item corresponding to the at least one resource.

6. The system of claim 1, wherein the plurality of computer instructions further cause the computing device to at least alter the stringency of the authorization rule based at least in part on the user device being located within a transmission range of at least one wireless network beacon.

7. The system of claim 1, wherein the plurality of computer instructions further cause the computing device to at least determine that a location of the user device corresponds to a public area, the at least one setting comprising a screen brightness level.

8. A method, comprising:
    obtaining a request from a user device to access a wireless network beacon;
    obtaining a device profile for the user device based at least in part on the request, wherein the device profile indicates a state of the user device;
    determining that the user device satisfies an authorization rule based on the state of the user device as indicated by the device profile;
    causing the user device to access at least one resource, the at least one resource corresponding to at least one resource rule specifying that the at least one resource is encrypted and that the user device contains at least one mechanism to decrypt the at least one resource; and
    authorizing the user device to access the wireless network beacon responsive to determining that the user device satisfies the authorization rule and the at least one resource rule;
    configuring at least one setting on the user device based at least on part on a management policy and the wireless network beacon responsive to authorizing the user device to access the wireless network beacon, wherein the at least one setting alters at least one functionality provided by the user device;
    determining a stringency of the authorization rule based on the state of the user device as indicated by the device profile subsequent to authorizing the user device to access the wireless network beacon; and
    determining that the user device fails to satisfy the authorization rule based at least in part on the stringency subsequent to authorizing the user device to access the wireless network beacon.

9. The method of claim 8, further comprising terminating access to the wireless network beacon for the user device responsive to determining that the user device fails to satisfy the authorization rule.

10. The method of claim 8, further comprising transmitting a key to the user device in response to determining that the user device satisfies the authorization rule, wherein the key facilitates access to a network associated with the wireless network beacon.

11. The method of claim 10, further comprising causing the key to be removed from the user device responsive to determining that the user device fails to satisfy the authorization rule.

12. The method of claim 8, wherein the device profile specifies a location of the user device.

13. The method of claim 8, wherein accessing at least one resource comprises:
   transmitting an associated content file into a memory location of a memory on the user device;
   removing a conflicting content file from the memory; and
   executing at least one application on the user device, the at least one application configured to render a content item corresponding to the at least one resource.

14. The method of claim 8, further comprising altering the stringency of the authorization rule based at least in part on the user device being located within a transmission range of at least one wireless network beacon.

15. A non-transitory computer readable medium storing a plurality of computer instructions executable by a computing device, wherein the plurality of computer instructions, when executed, cause the computing device to at least:
   obtain a request from a user device to access a wireless network beacon;
   obtain a device profile for the user device based at least in part on the request, wherein the device profile indicates a state of the user device;
   determine that the user device satisfies an authorization rule based on the state of the user device as indicated by the device profile;
   cause the user device to access at least one resource, the at least one resource corresponding to at least one resource rule specifying that the at least one resource is encrypted and that the user device contains at least one mechanism to decrypt the at least one resource;
   authorize the user device to access the wireless network beacon responsive to determining that the user device satisfies the authorization rule;
   configure at least one setting on the user device based at least on part on a management policy and the wireless network beacon responsive to authorizing the user device to access the wireless network beacon, wherein the at least one setting alters at least one functionality provided by the user device;
   determine a stringency of the authorization rule based on the state of the user device as indicated by the device profile subsequent to authorizing the user device to access the wireless network beacon; and
   determine that the user device fails to satisfy the authorization rule based at least in part on the stringency subsequent to authorizing the user device to access the wireless network beacon.

16. The non-transitory computer readable medium of claim 15, wherein the plurality of computer instructions further cause the computing device to at least:
   terminate access to the wireless network beacon for the user device responsive to determining that the user device fails to satisfy the authorization rule.

17. The non-transitory computer readable medium of claim 15, wherein the plurality of computer instructions further cause the computing device to at least transmit a key to the user device in response to determining that the user device satisfies the authorization rule, wherein the key facilitates access to a network associated with the wireless network beacon.

18. The non-transitory computer readable medium of claim 17, wherein the plurality of computer instructions further cause the computing device to at least cause the key to be removed from the user device responsive to determining that the user device fails to satisfy the authorization rule.

19. The non-transitory computer readable medium of claim 15, wherein when accessing at least one resource, the plurality of computer instructions further cause the computing device to at least:
   transmit an associated content file into a memory location of a memory on the user device;
   remove a conflicting content file from the memory; and
   execute at least one application on the user device, the at least one application configured to render a content item corresponding to the at least one resource.

20. The non-transitory computer readable medium of claim 15, wherein the plurality of computer instructions further cause the computing device to at least alter the stringency of the authorization rule based at least in part on the user device being located within a transmission range of at least one wireless network beacon.

* * * * *